United States Patent [19]

Bawa

[11] Patent Number: 4,719,657
[45] Date of Patent: Jan. 19, 1988

[54] METHOD OF FORMING IRIS VARIEGATION PATTERNS ON CONTACT LENSES

[75] Inventor: Rajan Bawa, Fairport, N.Y.

[73] Assignee: Bausch & Lomb Incorporated, Rochester, N.Y.

[21] Appl. No.: 844,652

[22] Filed: Mar. 27, 1986

[51] Int. Cl.⁴ .............................. D06P 5/12; D06P 5/00
[52] U.S. Cl. ...................................... 8/453; 8/446; 8/465; 8/507; 8/650
[58] Field of Search ...................... 8/507, 453

[56] References Cited

U.S. PATENT DOCUMENTS

| | | | |
|---|---|---|---|
| 1,644,798 | 10/1927 | Tillyer et al. | 427/165 |
| 4,238,524 | 12/1980 | La Liberte et al. | 8/507 |
| 4,303,701 | 12/1981 | Torgersen et al. | 8/507 |
| 4,447,474 | 5/1984 | Neefe | 8/507 |
| 4,457,761 | 7/1984 | Sliger | 8/507 |
| 4,494,954 | 1/1985 | Suminde | 8/507 |
| 4,518,390 | 5/1985 | Rabenau et al. | 8/507 |
| 4,634,449 | 1/1987 | Jenkins | 8/507 |

FOREIGN PATENT DOCUMENTS

| | | |
|---|---|---|
| 127771 | 10/1984 | European Pat. Off. . |
| 2845374 | 4/1979 | Fed. Rep. of Germany . |
| 1547525 | 6/1979 | United Kingdom . |
| 1583492 | 1/1981 | United Kingdom . |

Primary Examiner—A. Lionel Clingman
Attorney, Agent, or Firm—Craig E. Larson; Christopher E. Blank; Bernard D. Bogdon

[57] ABSTRACT

A tinted soft contact lens such as a hydrated hydrogel lens having a variegated iris pattern is prepared by forming an iris pattern on the lens with a viscous paste which can contain an unoxidized vat dye. The lens is treated with a developer solution to obtain a tinted lens having an iris pattern which can be clear or different in color or in hue from the surrounding iris area.

6 Claims, 2 Drawing Figures

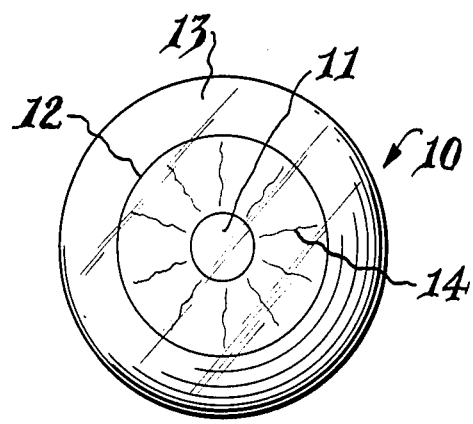
FIG. 1
FIG. 2
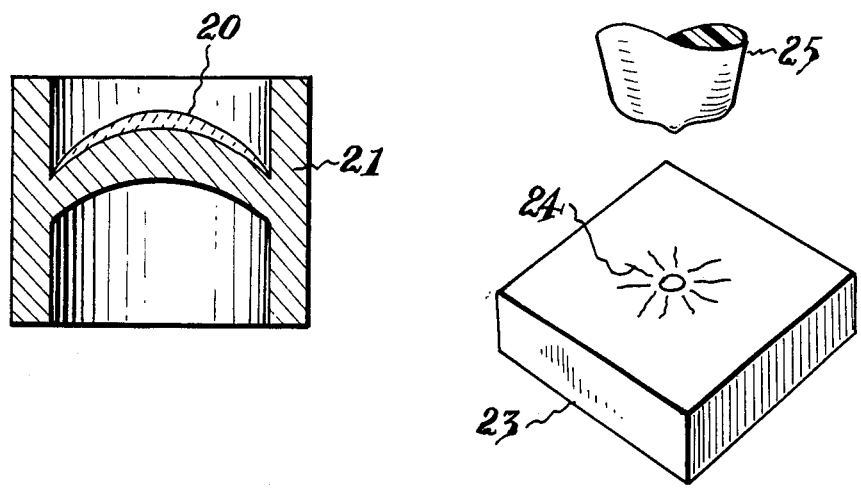

METHOD OF FORMING IRIS VARIEGATION PATTERNS ON CONTACT LENSES

FIELD OF THE INVENTION

This invention relates to contact lenses and more particularly to a method for forming an iris variegation pattern on such lenses.

BACKGROUND OF THE INVENTION

Contact lenses are often tinted for protecting the eyes against bright light or for cosmetic purposes, either to enhance the color of the eyes or to conceal disfigurements. Tinting is usually done with transparent dyes which can change or enhance the apparent color of a light colored iris. Recently the patents of C. W. Neefe, e.g., U.S. Pat. Nos. 4,460,523 and 4,472,327 have proposed a new kind of coloring technique for contact lenses which can actually change the apparent color of even a dark colored iris instead of merely enhancing the natural color. For example, a brown iris can be made to appear blue with such lenses. The technique of the Neefe patents is to incorporate in the lens material a mixture of transparent dye and reflective opaque particles such as titanium dioxide. A lens of this kind can mask the color of a dark iris and can change the apparent color to a lighter color.

A drawback of known tinted lenses, including these which contain only a dye and those which contain both a dye and opaque reflective particles, is that the lens has a uniform color and does not have the variegated pattern which characterizes the natural iris. To some extent the natural iris pattern may show through a lens which contains only a transparent dye but even with such lenses the iris pattern seems unnatural. Tinted lenses in general, and especially lenses containing opaque reflective particles, give an unnatural appearance to the eye which is sometimes called the lizard or bug-eye look.

To overcome the unnatural appearance of a uniformly colored iris, efforts have been made to form a variegated iris pattern on tinted lenses, as shown by the following references.

The patent to Le Grand et al, U.S. Pat. No. 3,712,718 discloses a plastic corneal contact lens having a transparent central zone and an irregular pattern of colored striations in the surrounding peripheral zone. The striations are cut or otherwise formed to a certain depth in the concave face of the lens. Then they are filled with an acrylic monomer and a translucent colorant. Next the material filling the striation cuts is cured to bond it to the transparent lens material.

The patent to Spivack, U.S. Pat. No. 3,536,386, also discloses a plastic contact lens with a simulated iris pattern. The lens is formed of two concentric halves with a imprinted iris pattern sandwiched between them.

While these earlier patents disclose methods which may or may not produce a natural looking iris pattern on a lens, the manipulative steps are complex and would add substantially to the cost of the lenses. Furthermore, it does not appear that their techniques would be at all useful with soft hydrogel contact lenses.

SUMMARY OF THE INVENTION

The present invention provides a method for forming iris patterns on swollen polymeric contact lenses which is simple, inexpensive and can be used in the automated manufacture of contact lenses and especially of soft, hydrated, hydrogel contact lenses.

In the method of the invention an iris pattern is formed on the swollen lens with a viscous paste containing an unoxidized vat dye or with such a paste containing no vat dye. At least the iris area of the lens is tinted before or after forming the pattern. In the case in which the paste contains no vat dye, the lens is treated with a solution of a vat dye while the paste is on the lens, allowing the dye to penetrate into the polymer of the lens. Thereafter the lens is treated with a developer solution to develop the vat dye of the dye solution when such a dye solution is employed and to develop the vat dye of the paste when it contains such a dye. The paste is washed away and the resulting lens is a tinted contact lens formed of a swollen polymer and having a variegated lens pattern.

THE DRAWINGS

The invention will be described in more detail by reference to the drawings of which FIG. 1 is a plan view of a lens having an iris pattern formed by the method of the invention; and FIG. 2 is a diagrammatic perspective view, partially in section, of apparatus for carrying out the method of the invention.

DETAILED DESCRIPTION

FIG. 1 shows a contact lens 10 made by the method of the invention, having a central clear zone 11 corresponding to the pupil of the eye, an annular tinted zone 12 corresponding to the iris of the eye and a peripheral zone 13 which can extend into the scleral region of the eye. The latter zone preferably is either transparent and colorless or is pigmented with a white pigment. In the annular zone or iris area 12 is a variegated pattern 14 formed by a dye which differs in color from the background tint of area 12. When the lens is placed on an eye the pattern 14 gives the appearance of a natural variegated iris pattern.

To prepare such a lens by the method of the invention, a viscous paste is formed with a liquid, a thickening agent and a vat dye in its unoxidized form. The paste is then used to form a variegated pattern on an untinted or a tinted hydrated hydrogel contact lens. The pattern can be in the form of irregular radial striations, as shown in the drawing, to imitate the natural iris pattern. The pattern can be formed manually, for example, with a fine brush or stylus, or by contacting the lens surface with a printing pad having the paste on its surface in the desired pattern.

After forming the variegated pattern on the lens surface, unless the lens has already been tinted, at least an annular area of the lens surface is treated with a solution of a second vat dye. The dye solution can be applied to the entire lens surface but, preferably, is applied only to the annular iris region, thus leaving a clear central circular area corresponding to the pupil and a clear peripheral area extending over the scleral region of the eye.

After treatment with the second dye solution, the entire lens is treated with a vat dye developer solution. This oxidizes the two dyes to form microprecipitates of the oxidized dyes of the desired colors within the three-dimensional matrix of the swollen lens polymer. Following this the paste pattern is washed from the lens surface. The result is a lens tinted with one selected color, such as blue, grey or green, and having a variegated pattern of a different color such as yellow or brown.

FIG. 2 of the drawing illustrates an apparatus which is useful for carrying out the embodiment of the invention in which the variegated pattern is applied to the lens by means of a resilient pad. In this embodiment, the posterior surface of an untinted hydrated hydrogel contact lens 20 is placed on a curved supporting surface 21. At the same time or beforehand, the dye paste formed of a water-soluble thickening agent and a vat dye is spread on the surface of a plate 23 which has etched or embossed in its upper surface a variegated iris pattern 24. Using a doctor blade, the excess paste is wiped from the plate, leaving paste only in the etched pattern. Then a soft, impervious, resilient pad 25 is pressed into contact with the pattern 24. The dye containing paste transfers to the surface of pad 25. The pad is then moved to a position above lens 20 and is pressed into contact with the anterior surface of the lens. This causes the pattern of dye-containing paste to transfer to lens 20. By positioning pad 25 accurately above the lens and lowering it vertically into contact with the lens using, for example, an adapted drill-press mechanism not shown in the drawing, the variegated pattern can be printed precisely in the desired iris area of the lens.

After imprinting the lens with the dye-containing paste, the lens is treated with an aqueous solution of a vat dye which is different in color from the dye of the water-soluble paste. When the dyes have been sufficiently imbibed into the hydrated lens, the lens 20 is removed from the support and placed in a vat dye developing solution, e.g., an oxidizing solution such as a solution of sulfuric acid and sodium nitrite. This causes development of both vat dyes, the dye which tints the overall area of the lens and the dye which provides the variegated pattern on the lens. In the embodiment of FIG. 2, the peripheral annular region of the lens is not tinted.

After development of the two dyes, the lens is washed in distilled water to remove any residual paste and the developing solution. The result is a lens with a tinted circular region having a contrasting dyed variegated iris pattern and a peripheral clear zone.

The method of the invention, wherein a viscous paste is used to form a variegated iris pattern on a contact lens, is subject to a number of variations. To illustrate this, several embodiments of the method will be set forth in outline form. One preferred embodiment has been described above and it can be outlined as follows:

Embodiment "A"

(a) Form an iris pattern on a lens with a paste containing a first vat dye.
(b) Treat at least the iris area of the lens with a solution of a second vat dye.
(c) Treat the lens with a vat dye developer solution.
(d) Wash away the paste.
(e) Obtain a lens having an iris of one color and a variegated iris pattern of another color.

Examples of other embodiments, in outline, are as follows:

Embodiment "B"

(a) Tint at least the iris area of the lens by any method.
(b) Form a pattern in the iris area with a viscous paste containing a vat dye differing in color from the dye used to tint the iris area.
(c) Treat the lens with a vat dye developer solution.
(d) Wash away the paste.
(e) Obtain a lens with a tinted iris having a contrasting variegated pattern.

Embodiment "C"

(a) Form an iris pattern on a lens with a paste containing no vat dye.
(b) Treat at least the iris area with a solution of a vat dye.
(c) Treat the lens with a vat dye developer solution.
(d) Wash away the paste.
(e) Obtain a lens having a tinted iris area and a clear, untinted iris pattern.

Embodiment "D"

(a)–(d) Same as in Embodiment "C".
(e) Treat at least the iris area with a solution of the same vat dye as in step (b) or with a solution of a different vat dye.
(f) Treat the lens with a developer solution.
(g) Obtain a lens having a dyed variegated iris pattern and a surrounding iris area of darker hue or of different color.

If desired, a clear untinted central pupilar area can be provided in the finished lens as shown in FIG. 1. This can be done in more than one way. One method is to mask a central circular portion of the lens before the tinting dye is applied by imprinting it with a circular pattern of water-soluble paste containing no dye. When the tinting dye solution is later applied to the lens, the paste protects the central region against being dyed and when later washed away leaves a clear pupilar area surrounded by an annular tinted area and a variegated pattern.

FIG. 2 illustrates the application of the dye-paste and the dye-solution to the anterior surface of the lens and this is the preferred surface for such dyes. It is also acceptable to turn the lens over and apply the overall dye and the variegated pattern to the posterior surface or to both surfaces, if desired.

In the apparatus shown in FIG. 2, the materials of construction can vary considerably although certain materials are preferred. For example, plate 23 advantageously is a steel plate, because steel is durable, can be etched precisely and can be kept clean. Other metals, brass or copper, for example, can also be used as well as rigid plastic, glass or ceramic materials.

The pad 25 is advantageously made of soft, resilient silicone rubber. Its virtues are that it is durable, impervious and has such low surface energy that the paste releases and transfers readily from the pad to the hydrated lens surface. Natural rubber and other soft resilient plastic materials are also useful. The shape of the pad can vary considerably. The shape illustrated in the drawing is advantageous in permitting the pad bearing the dye-containing paste to enter the region surrounded by the vertical wall of support 21.

Support 21 can be made of any rigid impervious materials. Impervious plastics or metals, such as steel or brass, are preferred.

The use of the dye paste and printing pad in accordance with the invention is especially amenable to automated manufacture of hydrated hydrogel lenses. The elements of the apparatus illustrated in FIG. 2 can be readily incorporated in high speed and precise automated equipment. Since the lens surface is contacted with a soft deformable printing pad no harm is done to the delicate soft surface of the lens. Also, since a viscous dye paste is used, the pattern can be precisely imprinted without risk of the dye migrating undesirably. Likewise, since the lens is hydrated, it has affinity for the water-soluble dye in the paste and the dye is imbibed into the desired areas of the lens where it can later be developed. Thus the facts that the lens is hydrated, that the printing pad is resilient and that the variegated pattern is applied by means of a water-soluble paste all cooperate to yield a desired result, namely, the precise and effective dyeing of a pattern on a soft lens in a manner suitable for automated, large scale manufacture.

The hydrated hydrogel lenses for which the method of the invention is used can be composed of a wide range of hydrogel lens polymers, many of which are well known. These are hydrophilic polymers which are sparingly crosslinked.

As is well known in the art, hydrogel polymers can be made by free-radical polymerization and crosslinking of a monomer composition containing one or more vinyl monomers. Preferred monomers include esters and amides of acrylic and methacrylic acid which have at least one hydrophilic functional group and vinyl pyrrolidinones.

Examples include the hydrogels obtained by hydrating the polymers of monomers of hydroxyalkyl methacrylate, the alkyl group having 2 or 3 carbon atoms, which are crosslinked with about 0.1 to 2 percent by weight of an acrylic or dimethacrylic ester of an alkylene glycol having 2 to 3 carbon atoms or with divinylbenzene.

Typically useful hydrogel polymers are crosslinked polymers made from the following monomers and mixtures of monomers:
2-hydroxyethyl methacrylate (also known as HEMA)
HEMA with methacrylic acid
HEMA with 1-vinyl-2-pyrrolidinone
HEMA with 1-vinyl-2-pyrrolidinone and methacrylic acid
HEMA with 1-vinyl-2-pyrrolidinone and methyl methacrylate
HEMA with N-(1,1-dimethyl-3-oxobutyl) acrylamide
1-vinyl-2-pyrrolidinone with methyl methacrylate and allyl methacrylate
Preferred crosslinking agents for these monomers include divinylbenzene, 3,3-propandiol dimethacrylate and ethylene glycol and poly(ethylene glycol) dimethacrylates.

Other hydrated hydrogel lenses which can be employed in the method of the invention include lenses made from crosslinked collagen and from crosslinked gelatin, as disclosed, for example, in U.S. Pat. Nos. 4,268,131; 4,260,228; 4,264,155; 4,223,984; 4,349,470; 4,264,493; and 4,416,814.

The dye-paste used in the method of the invention is a viscous, sticky paste which contains a liquid, a thickening agent and a uniformly dispersed vat dye. The paste should be compatible with the lens polymer so that it sticks to the surface of the swollen lens, yet it should also be removable from the lens surface by washing with a liquid that is harmless to the lens. Preferably the liquid component of the paste is an aqueous liquid such as water or a mixture of water and a volatile solvent such as a lower alkanol. A solution of methanol in water, containing, e.g., 10 to 60 volume percent methanol and, preferably, 15 to 50 volume percent is especially suitable. When the paste is formed from such an aqueous liquid, it can later be washed from the lens with water.

When the paste is formed with an aqueous liquid, a preferred thickening agent is a water-soluble polymer which can be selected from a broad class of such polymers. Examples include poly(vinyl alcohol), poly(1-vinyl-2-pyrrolidinone), carboxymethyl cellulose, hydroxyethyl cellulose, hydroxypropylmethyl cellulose and methyl cellulose.

Although solubility of the thickening agent in the liquid is desirable, it is not essential. The liquid can be simply a carrier which disperses the thickening agent and vat dye. For instance, a suitable paste can be formed using a water-methanol mixture as the liquid carrier and using as the thickening agent a non-water-soluble resinous powder such as the class of powdered resinous pigments used for imparting fluorescent colors to plastics. Pigments known as the Day-Glo pigments of Day-Glo Color Corporation of Cleveland, Ohio, especially the Z-series of such pigments, consist of a fluorescent dye dispersed in a resin and ground to a fine powder. Whe mixed with a small amount of water or water-alcohol mixture and with the vat dye powder, they form a paste of good consistency for use in the method of the present invention. The color of the fluorescent pigment is unimportant because the paste is washed away and the pigment does not color the lens. Only the vat dye contained in the paste colors the lens.

Another useful carrier liquid for the dye and thickening agent is a water-soluble liquid monomer of the kind used to make hydrogel contact lenses. Especially useful is the monomer, 2-hydroxyethyl methacrylate, also known as HEMA. Also, a useful carrier is the monomer mix for making poly(HEMA) lenses. It contains not only the monomer but also glycerol, a crosslinking agent such as ethylene glycol dimethacrylate and small amounts of a catalyst and a polymerization inhibitor.

Still another example of a possible variation in the dye-paste composition is to use the powdered vat dye as the thickening agent. A satisfactory paste can be formed with a small amount of the HEMA monomer mix and sufficient powdered dye to provide a viscous paste.

The vat dyes used in the method of the present invention constitute a well-known class of dyes. They are dyes which in their reduced or non-oxidized state are water-soluble and can impregnate or migrate into a hydrated hydrogel polymer. Subsequent oxidation produces in situ an insoluble, microprecipitate of the colored dyestuff which is fast to washing, light and chemicals.

The oxidizing agents or developers for vat dyes include perborate, dichromate, sulfuric acid, sodium nitrite and similar aqueous oxidizing solutions.

Examples of vat dyes useful in the method of the invention include indigo (Colour Index 1177), Indanthene Blue GCD (C.I. 1113), Anthraquinone Vat Yellow GC (C.I. 1095), Anthrasol Blue IBC (C.I. 69826), Anthrasol Green IB (C.I. 59826), Anthrasol Brown IBR (C.I. 70801), Indigosol Yellow 2GB (C.I. 61726) and Soledon Blue 2RC (C.I. 69826). European Patent Application No. 84 302 443.1, published Oct. 24, 1984, Publication No. 0122771, discloses the tinting of hydrogel contact lenses with vat dyes. The dyes and developers in this publication are also useful in the method of the present invention.

Examples of several suitable polymeric thickening agents and of solvent concentrations for the pastes are given in the following table:

TABLE I

| Methanol (gm) | Water (gm) | Thickening Agent (gm) |
|---|---|---|
| 0.1 | 0.35 | 0.1 PVP (MW 360,000) |
| 0.1 | 0.35 | 0.5 PVP (MW 10,000) |
| 0.11 | 0.45 | 0.115 PVA (MW 133,000) |
| 0.1 | 0.35 | 0.2 PVA (MW 27,000) |
| 0.5 | 1.50 | 0.05 CMC (MW 60,000 – 100,000) |
| 0.11 | 0.75 | 0.15 HEC (MW 15,000) |
| 0.2 | 0.75 | 0.05 HPMC (MW 86,000) |
| 0.15 | 0.75 | 0.05 MC (MW 63,000) |

PVP Polyvinyl pyrrolidinone
PVA Polyvinyl alcohol
CMC Carboxymethyl cellulose
HEC Hydroxyethyl cellulose
HPMC Hydroxypropyl methylcellulose
MC Methylcellulose When the dye-paste variegated pattern is applied to the iris region of a hydrated lens, the dye apparently migrates into the lens polymer. Subsequently, when the lens is treated with an oxidizing developer, a microprecipitate of dye forms within the hydrated, cross-linked hydrogel and is immobilized. The paste, even though it is water-soluble also, evidently acts unexpectedly as a mask to prevent the overall vat dye solution from reaching the surface covered by the paste. Consequently, the portion of the lens surface covered by the paste is dyed one color and the portion contacted by the solution of the other dye is another color, with only slight and unobjectionable overlapping of the boundaries.

The following examples illustrate the method of the invention:

EXAMPLE I

A viscous paste is formed of 0.1 g of poly(vinyl pyrrolidinone) or PVP, mol. wt.=360,000, 0.35 g of water and 0.1 g of methanol. To the paste is added 0.43 g of the yellow vat dye Indigosol Yellow 2GB. A hydrated poly (HEMA) contact lens is dipped in a lens cleaning solution (Barnes-Hind solution) and placed with its concave surface centered on the convex surface of a plastic support. A variegated iris pattern is manually formed on the exposed convex surface of the lens with the described vat dye - PVP paste. After waiting 60 seconds, a solution of blue vat dye Soledon Blue 2RC is applied to the surface of the lens. After waiting again for 60 seconds, the lens surface is washed with distilled water to remove any remaining PVP paste and then with Barnes-Hind solution. The lens is then placed in an aqueous developing solution of sulfuric acid and sodium nitrite for 60 seconds after which the lens is again washed in distilled water to remove the acidic developer solution. The resulting lens is tinted blue except where covered by the yellow dye-paste. The latter area has a yellow variegated pattern resembling that of a natural eye.

Light-colored irises commonly not only have a variegated striated pattern, which the method of the invention provides, but also a deeper blue, gray or green hue at the periphery of the iris. In the method of the invention, the lens can also be given this darker periphery in the iris area. This can be done in at least three ways. One is to treat just the rim or periphery of the iris with dye solution, allowing about 45 to 60 seconds or more for the dye to penetrate. Then the whole surface of the lens is treated with a second quantity of the same dye solution, excluding, if desired, the central circular area corresponding to the pupil. The second dye solution is also allowed to penetrate for around 45 to 60 seconds and the lens is then treated with the developer solution. The peripheral area which has been treated twice with the dye solution will be somewhat darker than the rest of the iris area of the lens.

Another way is to treat the entire iris area with the usual dye solution and develop the dye. Then with the lens back on the support, a second quantity of the same dye solution is used to treat just the periphery of the iris area. After waiting about 45 to 60 seconds, the lens is treated with the developer solution a second time and the periphery will be somewhat darker than when only one development step is used.

Still another, and the preferred technique, is to use two dye solutions. The first solution has a higher dye concentration than the second, for example, double strength, and the dye solvent contains a more active swelling agent for the lens polymer than the normal dye solution. For instance, while the normal vat dye solvent for an acrylic hydrogel such as poly(HEMA) will be a 15 volume percent solution of methanol in water, the solution for dyeing the darker peripheral area will contain, for example, 50 volume percent methanol in water. The higher methanol content accelerates the opening of pores of the hydrogel. The first solution also has a higher dye concentration, e.g., 2X, and treatment with this solution, therefore, gives the deepest hue of the three techniques described. After the periphery of the area is treated with the concentrated solution, the entire iris area (excepting the pupil area, if desired) is treated with the normal dye solution and the entire lens is then treated with developer. The result is a lens closely simulating a natural iris having a deeper hue around its periphery.

Although the method of the invention has its most important uses with tinted hydrated hydrogel lenses, the invention can also be applied to swellable hydrophobic lenses. These include various polysiloxane lenses such as those disclosed in the patent to Deichert et al, U.S. Pat. No. 4,153,641 and the patent to Ichinohe et al, U.S. Pat. No. 4,433,125. To tint and form a variegated iris pattern on a lens of this kind, the lens is first swollen by soaking in an organic hydrophobic solvent such as methylene chloride, toluene, methylisobutyl ketone or mixtures thereof. The purpose is to open up the pore structure of the hard polymer, as occurs in hydrated hydrogel lenses, in order to allow penetration of the vat dye solution. The solvent swollen lens is then tinted and printed with vat dyes in accordance with the method of the invention.

Although the invention has been described in detail with reference to preferred embodiments, variations and modifications can be made within the spirit and scope of the invention as described above and as claimed.

I claim:

1. A method of forming a dyed pattern in the iris area of a hydrated hydrogel contact lens which comprises:
    forming a viscous paste which comprises an aqueous liquid, a thickening agent and a vat dye in its reduced state,
    applying the paste in the form of a pattern to the surface of a soft, resilient, impervious rubber or plastic pad,
    pressing the pad into contact with a portion of an annular area surrounding the pupilar zone in the iris area of the lens to transfer the paste in a pattern to said annular area, treating the lens with an aqueous solution of a different reduced vat dye, treating the lens with a vat dye developing solution to form on the lens a dyed pattern in the iris area and a contrasting background tint in areas not covered by the print paste, and thereafter washing the lens to remove any remaining paste and developer.

2. A method according to claim 1 wherein said viscous paste is applied to the pad by first applying the paste to a plate which has a pattern etched in its surface, wiping off the paste except in the etched pattern and pressing the pad into contact with the paste in the etched pattern to transfer the paste in the form of said pattern to the pad.

3. A method according to claim 2 wherein the pad is a soft, resilient silicone rubber pad.

4. A method of forming an undyed pattern in the iris area of a tinted hydrated hydrogel contact lens which comprises:

forming a viscous paste which comprises an aqueous liquid and a thickening agent and is free of vat dye in its reduced state, applying the paste in the form of a pattern to the surface of a soft, resilient impervious rubber or plastic pad, pressing the pad into contact with a portion of an annular area surrounding the pupilar zone in the iris area of the lens to transfer the paste in a pattern to said annular area, treating the lens with an aqueous solution of a reduced vat dye, treating the lens with a vat dye developing solution to form on the lens a background tint in areas not covered by the paste, and thereafter washing the lens to remove paste and developer, and obtaining a lens with an undyed pattern and a surrounding tinted area.

5. A method according to claim 4 wherein said viscous paste is applied to the pad by first applying the paste to a plate which has a pattern etched in its surface, wiping off the paste except in the etched pattern and pressing the pad into contact with the paste in the etched pattern to transfer the paste in the form of said pattern to the pad.

6. A method according to claim 5 wherein the pad is a soft, resilient silicone rubber pad.

* * * * *